United States Patent [19]

Keister

[11] 4,343,333
[45] Aug. 10, 1982

[54] FATIGUE RESISTANT HIGH PRESSURE HOSE

[75] Inventor: Bernard Keister, Aurora, Ohio

[73] Assignee: Eaton Corporation, Cleveland, Ohio

[21] Appl. No.: 70,206

[22] Filed: Aug. 27, 1979

[51] Int. Cl.$^3$ ............................................. F16L 11/12
[52] U.S. Cl. ..................... 138/125; 138/126; 138/130; 138/174
[58] Field of Search ............... 138/124, 125, 126, 127, 138/130, 172, 174

[56] References Cited

U.S. PATENT DOCUMENTS

| | | | |
|---|---|---|---|
| 940,779 | 11/1909 | Bayne et al. | 138/130 |
| 2,128,814 | 8/1938 | Gish | 138/125 |
| 3,011,525 | 12/1961 | Randle et al. | 138/126 |
| 3,056,429 | 10/1962 | Wilberg | 138/126 |
| 3,060,973 | 10/1962 | Munar | 138/126 |
| 3,790,419 | 2/1974 | Atwell | 138/130 X |
| 3,905,398 | 9/1975 | Johansen et al. | 138/124 |
| 4,196,464 | 4/1980 | Russell | 138/130 X |

Primary Examiner—James E. Bryant, III
Attorney, Agent, or Firm—C. H. Grace; A. E. Chrow

[57] ABSTRACT

An improved flexible reinforced hose (14) for use in the conveyance of fluids under pressure. The hose has a core tube (1) and an outer protective sheath (7). Disposed between the core tube and the sheath is a plurality of layers of reinforcement of which at least two of the layers comprise synthetic fibers having a tenacity of from about 12 to about 25 grams per denier and an elongation at break of from about 2% to about 8%. The hose is provided with improved resistance to pressure pulsation and flexing fatigue as a result of the said synthetic fiber layers being positioned in prescribed helically wound and/or braided combinations in conjunction with a prescribed twisted relationship that features the fibers closest to the core tube as a plurality of the same or different deniers of the fiber in the form of a plurality of cords having a twist of more than about 1.5 turns per inch and the fibers outwardly adjacent thereto as a plurality of the same or different deniers of the fiber having a twist of about 1.5 turns per inch or less.

19 Claims, 8 Drawing Figures

FATIGUE RESISTANT HIGH PRESSURE HOSE

INTRODUCTION

This invention relates generally to a flexible composite fibrous reinforced high pressure hose resistant to fatigue under pressure pulsation and flexing conditions.

BACKGROUND OF THE INVENTION

Fibrous reinforced hoses used for the conveyance of fluids under pressure are well known. Generally, such tigue under pressure pulsation and flexing conditions over equivalent hose constructions that utilize metallic wires for the reinforcing material.

Until recent time, fibrous reinforced hose has been limited in its pressure carrying capacity because of the strength limitations inherently associated with fibers made from conventional materials such as rayon, aliphatic nylon, cotton and poly(alkyline-terephthalate)ester, such as poly(ethylene-terephthalate)ester sold by E. I. du Pont de Nemours and Co., under the trademark "Dacron", and the like. Adding layer upon layer of such conventional fibers about the core tube of a hose is not the solution for significantly increasing its pressure carrying capacity for it has been found that such hoses tend to become overly large in their outer diameters and that the efficiency of each additional layer of reinforcement decreases as its radial distance from the outer surface of the core tube of the hose increases.

The development of fibers made from aromatic polyamide materials by personnel of E. I. du Pont de Nemours during the late 1960's and early 1970's such as disclosed in the U.S. Pat. No. 3,600,350, has for the first time provided the hose making industry with a fiber having significantly improved strength characteristics. The aromatic polyamide fiber is marketed by E. I. du Pont de Nemours and Co. under the trademark "Kevlar" and is known in the trade variously as "Fiber B" and as an "aramide" filament. Fibers spun from "Kevlar" aromatic polyamide have a high tensile modulus and are composed of monofilaments prepared from the reaction mixture of an aromatic dicarboxylic acid and an aromatic diamine such as terephthalic acid or anhydride and p-phenylene diamine. Alternatively, the aromatic polyamide may be an aromatic aminocarboxylic acid, such as 4-aminobenzoic acid. Fibers made from "Kevlar" generally exhibit a tenacity of from about 12 to about 25 grams per denier, with an average of about 20 grams per denier, and an elongation at break of about 2% to about 8% with an average of between 2% and 4%.

In contrast, fibers made from "Dacron" or aliphatic nylon filaments generally have a tenacity in the range of 8 to 12 grams/denier and an elongation at break in the range of about 8% to about 12%. Thus fibers made from "Kevlar" are generally twice as strong as the aforementioned conventional fibers and exhibit about one-half of the elongation at break of such fibers. The term "aromatic polyamide" fibers as used herein means a synthetic fiber made from aromatic polyamide having a tenacity in substantially untwisted form of from about 12 grams/denier to about 25 grams/denier and an elongation at break of about 2% to about 8%.

It is also known to those familiar in the synthetic fiber art that the amount of twist in the fiber, expressed in turns/inch, has an effect upon the tenacity of the fiber. Generally, the tenacity of a fiber will increase up to a point as the amount of twist is increased and once that point is exceeded will then begin to decrease as the amount of twist becomes increasingly excessive. E. I. du Pont de Nemours discloses such a phenomena related to "Kevlar" on Page 7 of their Bulletin K-3 dated December 1978.

Also to be considered in the art of constructing high pressure hoses is whether to utilize one or more helically wound or braided reinforcement layers or combinations thereof. Generally, one or more layers of helically wound reinforcement has been used in the past to provide hose capable of withstanding extremely high pressure. Helically wound layers of reinforcement are believed to provide greater strength over an equivalent amount of braided reinforcement due to the fact that adjacent fibers in each layer are able to lay more intimately against each other in contrast to the "in and out" pattern associated with a braided construction. An example of an early use of combined spiral wrapped and briaded reinforcement in high pressure hose can be found in U.S. Pat. No. 1,973,756 in which is disclosed a flexible hose capable of withstanding extreme pressures having a braided reinforcement sheath about the core tube and a helically wound reinforcement sheath about the braided sheath with a yieldable material disposed between the reinforcement layers. The disclosure however is directed primarily towards the use of metal wire as the reinforcement material and does not take into account the effect that twist may have on fibrous reinforcements.

Although it has been found that aromatic polyamide fibers can be used to provide hoses designed to withstand extremely high pressure, it has also been found that such hoses, for some not yet understood reason, exhibit poor resistance to flexing and pressure pulsation fatigue and that something more is required than merely increasing the twist of such fibers to provide an optimum level of tenacity.

It has been discovered that a significant improvement in the resistance to flexing and pressure pulsation fatigue of high pressure hoses utilizing aromatic polyamide can be achieved where there is a prescribed relationship between the amount of twist associated with successive layers of such fiber about the core tube of the hose. Thus, the present invention contemplates a means by which the aforementioned strength of aromatic polyamide fibers, such as "Kevlar", can be used to advantage and further provides a means of significantly improving the working life associated with the use of such hose.

SUMMARY OF THE INVENTION

It is therefore an object of this invention to provide a hose capable of conveying fluids under extremely high pressure in conjunction with having improved resistance to flexing and pressure pulsation fatigue.

It is another object of this invention to provide a reinforced hose that utilizes aromatic polyamide fibers for at least a portion of its reinforcement in a manner such that the resistance of the hose to flexing and pressure pulsation fatigue is significantly improved.

DETAILED DESCRIPTION OF PREFERRED EMBODIMENTS

Figure 1:
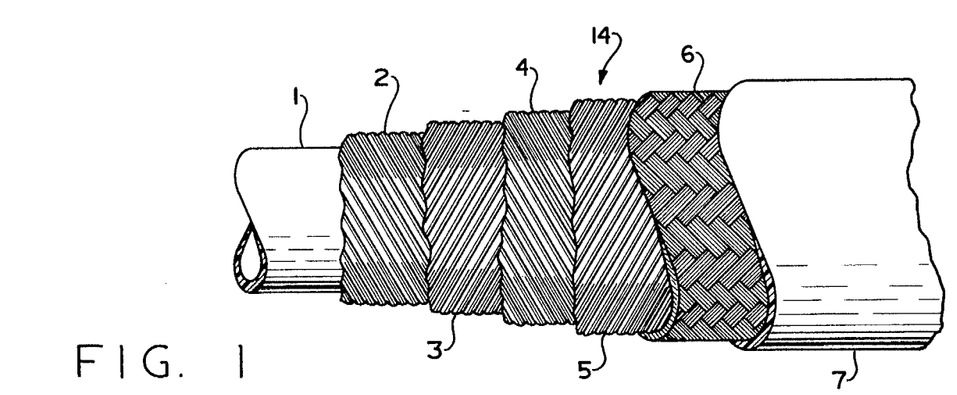
FIGS. 1 through 4 are side elevations of embodiments of hoses made in accordance with the invention.

FIG. 1 shows an embodiment of hose 14 of the invention having a core tube 1 surrounded by an outer protective sheath 7. Sheath 7 is cut away to show a plurality of layers of fibrous reinforcement disposed between core tube 1 and sheath 7. A first layer 2 of fibrous reinforcement is disposed in adjacent relationship about the outer surface of core tube 1 and comprises a plurality of aromatic polyamide fibers that are in substantial adjacent parallel relationship to each other and are wound under suitable tension about core tube 1 in such a manner as to provide the amount of coverage desired. In the design of high pressure hoses, it is generally desired to cover at least 90% of the outer surface of a core tube in the case where maximum strength is required. Second layer 3 comprises a plurality of adjacently parallel aromatic polyamide fibers that are wound helically about layer 2 in a direction generally opposite to the direction of winding layer 2. Layer 2 and 3 are each termed what is known as "half-laps" in the trade. Oppositely wound helical layers of fiber are normally used in pairs in hose constructions so as to counterbalance the torsional twist that may occur under pressure by the use of only a single layer wound helically about the core tube. Third layer 4 is disposed about layer 3 and is comprised of a plurality of helically wound substantially parallel adjacent aromatic polyamide fibers that are wound in a direction generally opposite to layer 3. Fourth layer 5 is disposed about layer 4 and is comprised of plurality of helically wound substantially parallel adjacent aromatic polyamide fibers that are wound in a direction generally opposite to the winding direction of layer 4. Fifth layer 6 is a braided layer of fibrous reinforcement that may be made of any suitable fiber such as, for example, aromatic polyamide, aliphatic Nylon or "Dacron" or mixtures thereof. The fibers of the fifth layer 6 shown in the hose of FIG. 1 are made from "Dacron". A braided layer features the winding of the fibers in substantially opposite directions about the core tube and, as such, generally does not require a second braided layer to counterbalance any torsional twist as in the case of a helically wound layer.

The adjacently parallel aromatic polyamide fibers in each of layers 2, 3, 4 and 5 and the adjacent fibers of braided layer 6 are each comprised of selected deniers of fiber where denier is a term relating to the weight of the fiber per a given length and is reflective of the amount of monofilaments present. Generally, the larger the denier number, the greater the number of monofilaments present and the heavier the fiber. Several deniers of a given fiber are usually available from their manufacturer and the user may combine deniers to provide the amount of fiber desired to be used in a particular application. For example, 1000 and 1100 denier "Dacron" and 1500 denier aromatic polyamide are presently available and are commonly used by manufacturers of reinforced hose.

In addition to variations in denier, fibers can usually be purchased either without twist or with a limited amount of twist in the deniers standardly available and the combining of deniers also provides an opportunity for incorporation of a twisted relationship between the deniers combined. Fiber manufacturers generally limit the amount of twist in standard deniers to 1.5 turns per inch or less leaving it to the user or the users converters to provide greater twist where desired. As used herein the term denier means a denier of such fiber that is twisted to 1.5 turns per inch or less and a plurality of deniers means a plurality of the same or different deniers of the fiber. The direction of twist can be either clockwise or counterclockwise when viewed from the end of the fiber. In the trade, a clockwise twist is designated a "Z" twist and a counterclockwise twist is designated an "S" twist. The twisting together of a plurality of the same or different deniers of fiber in a direction opposite to the direction of twist in each of the deniers of the fiber provides what is called "cord" or "corded" fiber in the trade. Thus, for example, a "cord" is created where two deniers of a given fiber (each having a "Z" twist) are twisted together in an "S" twist. The term "cord" or "corded" fiber as used herein means a plurality of the same or different deniers of such fiber twisted together at more than about 1.5 turns per inch in a direction when viewed from the end of the combination of deniers that is opposite to the direction of twist associated with each of the deniers.

The angle between the fibers and the central longitudinal axis of the hose is generally dependent upon the relationship between the strength, elongation and volumetric expansion characteristics desired for a particular hose. In most cases the fiber is disposed about the core tube at an angle of between 40° and 60° from the central longitudinal axis of the hose. Although a single pair of two adjacent helically wound half laps would generally have opposite angles as close as possible to each other in order to counter balance torsional twist, another layer of braided fiber or pair of oppositely helically wound half laps may have an angle that is significantly different from the angle associated with another layer of reinforcement in the hose. Generally, the larger the angle of the fiber from the central longitudinal axis of the hose then the lower the diametrial expansion and the greater the elongation of the hose. In the case of high pressure hose, it is preferred to combine fibers angles such that the result of the combination provides an optimum amount of strength available from the fibers in combination with an elongation characteristic that is about neutral at the working pressure of the hose.

It has been found that in order to improve the resistance to flexing and pressure pulsation fatigue in high pressure hose construction utilizing aromatic polyamide fibers, the aromatic polyamide fibers closest to the core tube should be in the form of cord, previously described, having a twist of more than about 1.5 turns per inch and that one or more layers of aromatic polyamide fibers of the same or different denier having a twist of about 1.5 turns per inch or less should be disposed in adjacent relationship in a prescribed manner about the corded layer or layers or aromatic polyamide fibers.

In FIG. 1, the aromatic polyamide fibers in layers 2 and 3 comprise a plurality of cords of said fiber having a twist of more than about 1.5 turns per inch and the aromatic polyamide fibers in layers 4 and 5 comprise a plurality of the same or different deniers of said fiber having a twist of about 1.5 turns per inch or less. It is believed that the amount of twist associated with corded deniers of aromatic polyamide fibers should not exceed about 17 to 20 turns per inch and that a preferred combination is where one or more layers of aromatic polyamide fibers adjacent the core tube, as described herein, comprise a plurality of the same or different deniers of said fiber corded together with a twist of from about 4 to about 10 turns per inch and more preferably about 7 turns per inch and one or more layers of aromatic polyamide fibers, as described herein, comprising a plurality of the same or different deniers of said fiber having a twist of about 1.5 turns per inch or less are disposed outwardly adjacent thereto.

Core tube 1 may be made from rubber or other flexible polymeric materials such as for example nylon or polyurethane. Core tubes suitable for use in hoses of the invention generally have bore sizes that range from $\frac{1}{8}''$ to about $1\frac{1}{2}''$ in diameter with wall thicknesses that range from about 0.030" to about 0.250" depending on the material used and the particular application.

Although not shown in FIG. 1, the fibers within each layer and between layers of hose embodiments made in accordance with the invention may be bonded to each other and to core tube 1 and sheath 7 by suitable means. A preferred method of bonding the fibrous layers together and to the sheath is to extrude a polymeric adhesive between the outermost fiber layer and the sheath and between the various layers of fibrous reinforcement during the process of making the hose.

Although only one braided layer 6 is shown in FIG. 1, it is to be understood that more than one braided layer or combinations of braided and helically wound layers of fibrous reinforcement or helically wound layers of any suitable material may be used in hoses made in accordance with the invention provided that in the manner prescribed herein the innermost layer or layers of aromatic polyamide fibers comprise a plurality of cords of said fiber having a twist of more than about 1.5 turns per inch and the one or more layers of polyamide fibers outwardly adjacent thereto comprise a plurality of deniers of said fiber having a twist of about 1.5 turns per inch or less.

Sheath 7 of the hose embodiment of FIG. 1, as well as for all embodiments of hoses made in accordance with the invention, may be made from any suitable flexible material that provides the physical and chemical resistance characteristics desired as well as providing protection for the fibrous layers disposed between the sheath and core tube 1. Sheath 7 may, for example, be in the form of a metallic wire braid or it may be formed by wrapping with a variety of materials or may be extruded from a flexible rubber, nylon, polyurethane or the like. A preferred embodiment of the invention is where core tube 1 is made from an extruded flexible nylon and sheath 7 is made from an extruded flexible polyurethane.

Figure 2:
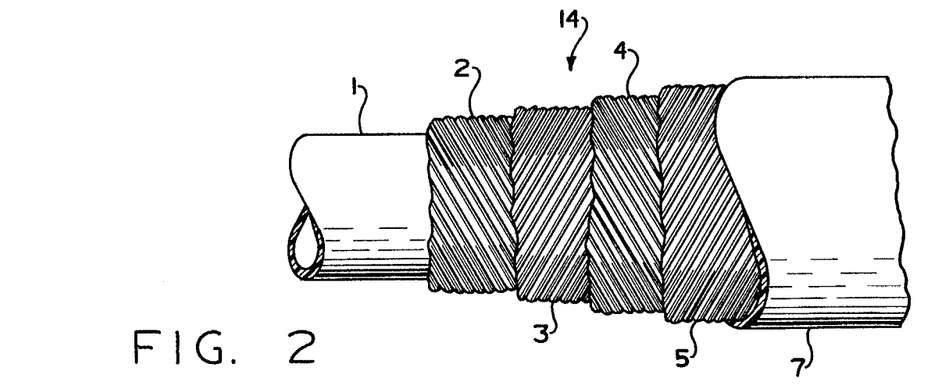

FIG. 2 illustrates an embodiment of hose 14 of the invention having helically wound reinforcement layers 2, 3, 4 and 5 of aromatic polyamide fibers hereinbefore described for FIG. 1 disposed about core tube 1 and enclosed by sheath 7. Other than the absence of the additional braided reinforcement layer 6 shown in FIG. 1, the above description in regards to the hose 14 embodiment of FIG. 1 also pertains to the hose 14 embodiment of FIG. 2 since the incorporation of the stated layers of aromatic fiber provides the required twist relationship in the manner prescribed.

Figure 3:
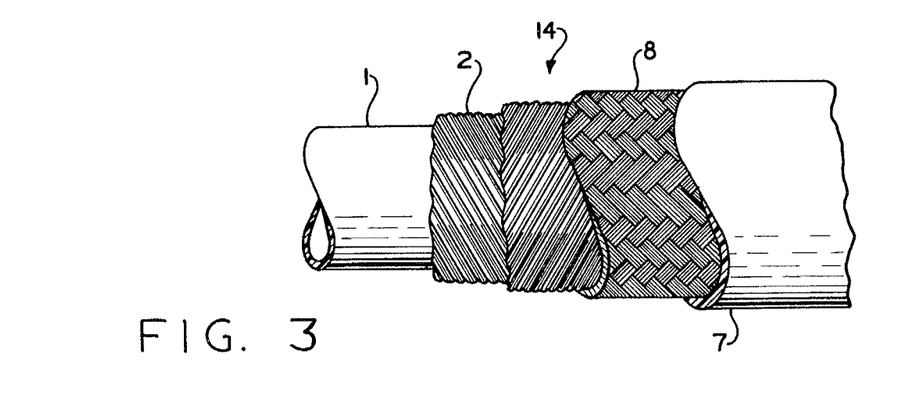

FIG. 3 illustrates an embodiment of hose 14 of the invention in which a third layer 8 of braided aromatic polyamide fibers is used in place of the opposite helically wound layers 4 and 5 of the embodiment of hose 14 shown in FIG. 1. In the embodiment of FIG. 3, first layer 2 of helically wound aromatic polyamide fibers is disposed in adjacent relationship about the outer surface of core tube 1. Second layer 3 of aromatic polyamide fibers is wound helically about layer 2 in a direction opposite to the winding direction of layer 2 and braided third layer 8 is disposed between layer 3 and sheath 7. Since braided layer 8 replaces layers 4 and 5 of FIG. 1, it is required that the fibers of braided layer 8 comprise a plurality of the same or different deniers of aromatic polyamide fiber having a twist of about 1.5 turns per inch or less as hereinbefore described for layers 4 and 5 that are braided together to provide layer 8. Otherwise, the description herein relating to the hose 14 embodiment of FIG. 1, also pertains to the hose 14 embodiment shown in FIG. 3. Additional layers of reinforcement may be disposed between braided layer 8 and sheath 7.

Figure 4:
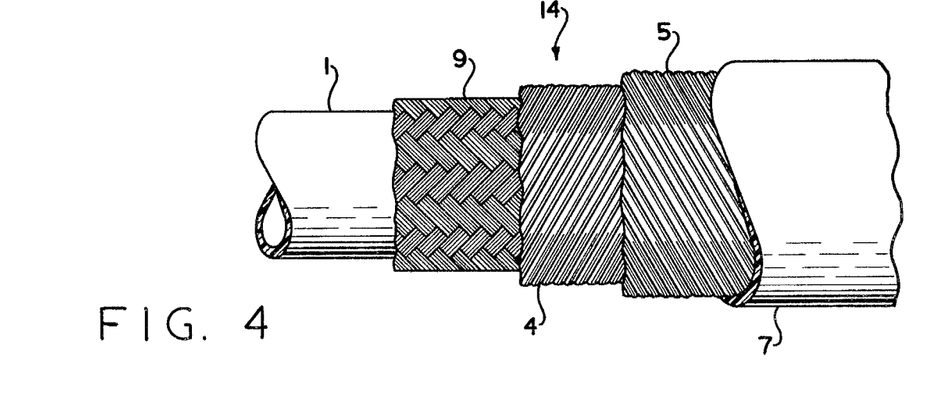

FIG. 4 illustrates an embodiment of hose 14 of the invention wherein a first layer 9 of braided aromatic polyamide fibers is used to replace the layer of oppositely helically wound aromatic polyamide fibers comprising layers 2 and 3 of FIG. 1. Since braided layer 9 is adjacent to the outer surface of core tube 1, the fibers in braided layer 9 comprise a plurality of the previously described cords of said fiber having a twist of more than about 1.5 turns per inch that are braided together. Second layer 4 of aromatic polyamide fibers is wound helically about layer 9 and third layer 5 of aromatic polyamide fibers is wound helically about layer 4 in a direction opposite to the winding direction of layer 4. Core tube 1, and reinforcement layers 4, 5 and 9 are enclosed by protective sheath 7. Since layers 4 and 5 are disposed outwardly adjacent to the innermost layer 9, the deniers of said fibers in each of layers 4 and 5 are twisted to about 1.5 turns per inch or less as described herein in regards to FIG. 1.

Figure 5:
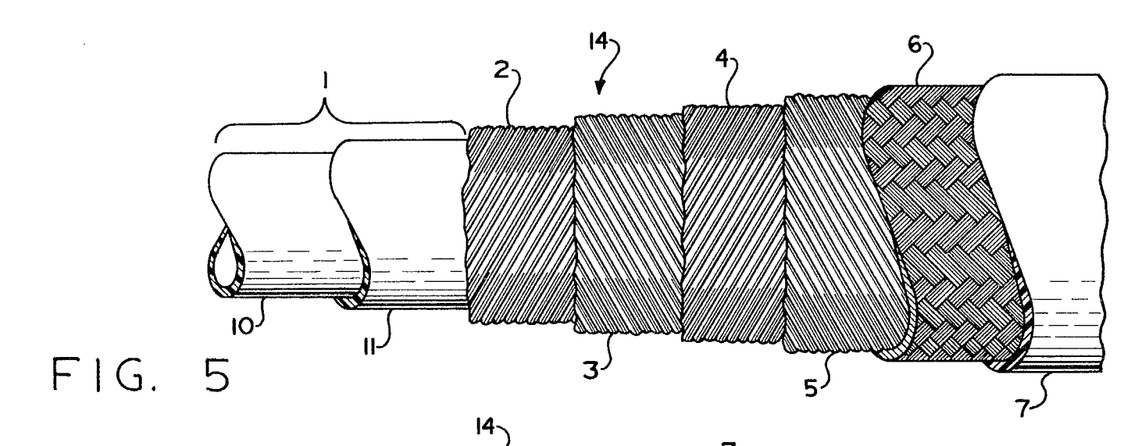
FIG. 5 is a side elevation of an embodiment of a hose made in accordance with the invention.

FIG. 5 illustrates an embodiment of hose 14 of the invention that is essentially the same as the embodiment shown in FIG. 1 excepting that core tube 1 is a laminated structure comprising an inner layer 10 and an outer layer 11. A composite core tube 1, such as shown in FIG. 5, can be used to advantage when, for example, inner layer 10 is made from a material having good resistance to corrosive fluids and layer 11 is made from a material selected to provide a bonding means to a reinforcement layer adjacent thereto or to increase the flexibility of core tube 1 or both. A preferred embodiment of the invention is where inner layer 10 is made from an extruded flexible nylon material and outer layer 11 is made from an extruded polyurethane that can be softened by means of a solvent, such as n-methyl pyrolidone, such that at least a portion of the layer of aromatic fibers adjacent the outer surface of layer 11 become embedded in the outer surface thereof during the process of making hose 14. Such a solvating method may also be used where core tube 1 is made solely from a solvatable polyurethane.

Figure 6:
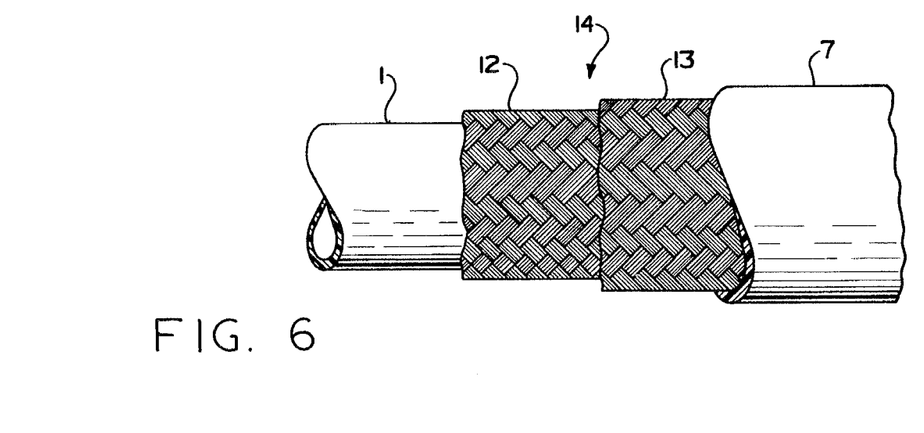
FIG. 6 is a side elevation of another embodiment of the hose of the invention.

FIG. 6 shows an embodiment of hose 14 having two braided layers of fibrous reinforcement made from aromatic polyamide. First braided layer 12 of aromatic polyamide fibers is disposed in adjacent relationship about the outer surface of core tube 1. Braided layer 12 corresponds to helically wound layers 2 and 3 described herein in regards to the hose embodiments shown in FIGS. 1, 2, 3 and 5. The fibers of layer 12 comprise a plurality of the previously described cords of said fiber having a twist of about 1.5 turns per inch or more that are braided together. Second braided layer 13 is disposed about braided layer 12 and is enclosed by protective sheath 7. Braided layer 13 corresponds to helically wound layers 4 and 5 described above in regards to the hose embodiments shown in FIGS. 1, 2, 4 and 5. The fibers of layer 13 are made from aromatic polyamide and comprise a plurality of the same or different deniers of said fiber having a twist of about 1.5 turns per inch or less that are braided together. Although the embodiment of hose 14 shown in FIG. 6 has only two braided layers. The position and twist relationship of layers 12 and 13 meet the requirement of the invention. Additional braided and/or helically wound reinforcement layers may be disposed between layer 13 and sheath 7 if such is desired. Aside from the absence of helically wound layers 2, 3, 4 and 5 in the hose embodiment shown in FIG. 6, the description given in regards to the hose 14 embodiment of FIG. 1 also pertains to the embodiment of FIG. 6.

Figure 7:
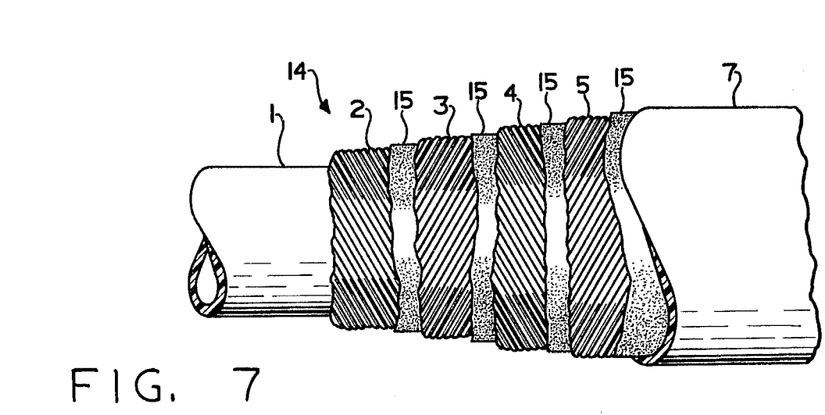
FIG. 7 is a partially broken away side elevation of a bonded version of the hose embodiment of FIG. 2.

FIG. 7 shows an embodiment of hose 14 of the invention that is a bonded version of the embodiment of FIG. 2 in which helically wound reinforcement layers 2, 3, 4 and 5 and sheath 7 previously described with respect to FIG. 2 are preferably bonded together by means of a polymeric material layer 15 extruded between reinforcement layers 2, 3, 4 and 5 and between reinforcement layer 5 and sheath 7.

Figure 8:
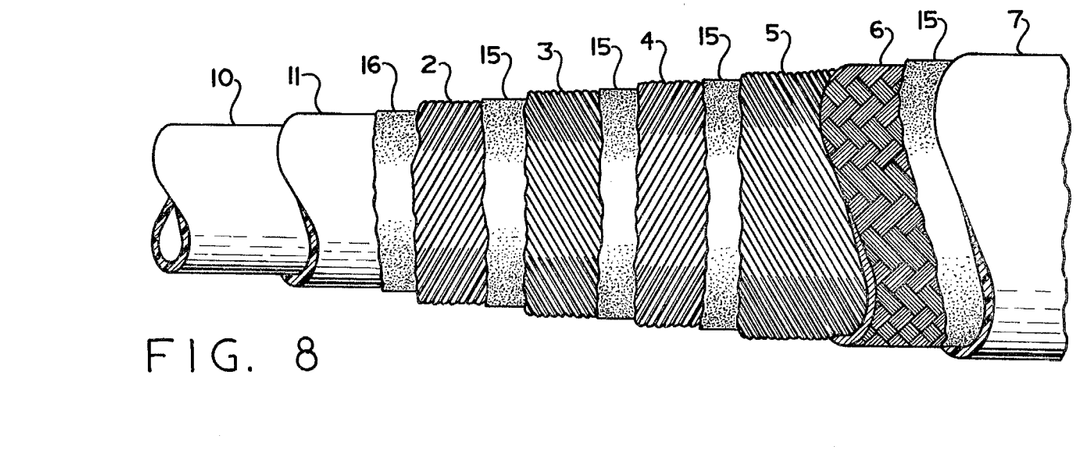
FIG. 8 is a partially broken away side elevation of a section of a bonded version of the hose embodiment of FIG. 5.

FIG. 8 shows a bonded version of hose 14 of FIG. 5 in which helically wound reinforcement layer 2 is preferably bonded to outer layer 11 by means of layer 16. Layer 16 represents the solvent softened outer surface of layer 11 previously described with respect to FIG. 5 in which at least a portion of the reinforcement fibers adjacent layer 11 have become embedded to bond layer 2 to layer 11. Also shown in FIG. 8 is polymeric material layer 15 disposed preferably by extrusion respectively between reinforcement layers 2, 3, 4 and 5 and between braided layer 6 and sheath 7 to bond them together.

Following Table I illustrates an example of the improvement of the flexing and pressure pulsation fatigue resistance associated with a hose made in accordance with the invention.

TABLE I

| EXAMPLE | A | B | C | D |
|---|---|---|---|---|
| Ambient Burst (psi) | 42000–47000 | 43000–45000 | 38000–39000 | 37000–39000 |
| Elongation (%) at 10,000 psi | 1.50 to 2.00 | −2.75 to −2.50 | −3.75 to −3.50 | −5.50 to −5.00 |
| Volumetric Expansion (cc/ft. at 10,000 psi) | 2.6 | 3.0 | — | — |
| Flex Impulse (Cycles to failure at 10,000 psi) | 3735 | 41,771 | 5475 | 21,936 |
| | 4665 | 24,244 | 6506 | 25,851 |
| | 2439 | 33,114 | 5768 | — |
| | 4992 | 40,265 | — | — |
| | 6323 | 20,108 | — | — |
| | — | 31,903 | — | — |
| X (Average) | 4431 | 31,901 | 5916 | 23,894 |

The flexing and pulsing conditions for the above examples were:
Oil Temperature 150° F.
Impulse Rate (cycles per minute) 35
Flex Rate (cycles per minute) 60
Oil Pressure Rise Rate S.A.E.
Flexing Distance ±1 Inch
Hose Length 4½ Inch The description of the Table I example is:

| | A | B | C | D |
|---|---|---|---|---|
| Core Tube | Nylon | Composite Nylon Inner layer and polyurethane outer layer | Same as B | Same as B |
| Reinforcement: (Numbered from core tube outward - Aromatic Polyamide Fiber unless otherwise noted) | | | | |
| First Layer | Braided 4500 denier twisted at 1.5 turns/inch | Helically wound 3000 denier cord twisted at 6.9 turns/inch | Helically wound 3000 denier twisted at 1.5 turns/inch | Helically wound 3000 denier cord twisted at 6.9 turns/inch |
| Second Layer | Braided 4500 denier twisted at 1.5 turns/inch | Helically wound opposite to first layer 3000 denier cord twisted at 6.9 turns/inch | Helically wound opposite to first layer - 3000 denier twisted at 1.5 turns/inch | Helically wound opposite to first layer 3000 denier cord twisted to 6.9 turns/inch |
| Third Layer | Helically | Helically | Helically | Helically |

TABLE I-continued

|  | | | | |
|---|---|---|---|---|
|  | wound 3000 denier twisted at 1.5 turns/inch | wound opposite to second layer 3000 denier twisted at 1.5 turns/inch | wound opposite to second layer 3000 denier twisted at 1.5 turns/inch | wound opposite to second layer 3000 denier cord twisted at 6.9 turns/inch |
| Fourth Layer | Helically wound opposite to third layer 3000 denier twisted at 1.5 turns/inch | Helically wound opposite to third layer 3000 denier twisted at 1.5 turns/inch | Helically wound opposite to third layer 3000 denier twisted at 1.5 turns/inch | Helically wound opposite to third layer - 3000 denier cord twisted at 6.9 turns/inch |
| Fifth Layer | Braided 3300 denier "Dacron" twisted at .6 turns/inch | Same as A | Same as A | Same as A |
| Sheath | Polyurethane | Polyurethane | Polyurethane | Polyurethane |
| Bonding | Sheath bonded to outer braid with extruded polymeric adhesive | First reinforcement layer bonded to core tube by solvation and all reinforcement layers and reinforcement to sheath bonded with extruded polymeric adhesive | Same as B | Same as B |

NOTE:
Where indicated as corded, 3000 denier comprises two-1500 denier corded together at the indicated twist. 4500 denier comprises three 1500 denier combined together at the indicated twist. 3300 denier refers to "Dacron" and comprises three 1100 denier combined together at the indicated twist.

Example "B" in Table I is a hose made in accordance with the invention and illustrates the improved resistance of flexing and pressure pulsation fatigue associated therewith by exhibiting a distinctly higher average life cycle in comparison to Examples A, C and D under the testing conditions prescribed. Example "D" in Table I, illustrates that, although an improvement in flexing fatigue can be achieved when the third and fourth layers are corded with the same twist as the first and second layers, the combination does not provide sufficient strength to meet the minimum 40,000 psi burst requirements required of the particular hose design evaluated in Table I.

Although not completely understood, it is believed that placing a plurality of cords of aromatic polyamide fibers that are twisted to more than about 1.5 turns per inch in adjacent relationship about the outer surface of the core tube of the hose in the manner prescribed herein provides a means of increasing the elongation over that associated with a fiber having lesser twist and that such increased elongation can be used to advantage in reducing the initial stress on fibers created by expansion of the core tube under pressure and that would naturally occur in compression on the inner portion of the hose and in tension on the outer portion of the hose in the region of flexing. It is also believed that the aromatic polyamide fiber layer or layers disposed about the outer surface of the core tube in the manner prescribed that comprise a plurality of cords having a twist of more than about 1.5 turns per inch are, because of the increased elongation associated therewith, able to transfer the load created by pressurization and/or flexing of the hose of the invention to the outwardly adjacent layer or layers of aromatic polyamide fibers hereinbefore described, having a twist of about 1.5 turns per inch or less such that efficient utilization of the strength available from the aromatic polyamide is realized. Thus the invention generally contemplates the use of a plurality of reinforcement layers of which at least two of the layers are comprised of polyamide fibers having the configuration position and twist relationships hereinbefore described. It is to be understood that the invention includes additional layers of fibrous reinforcement disposed about the layers of aromatic polyamide fibers having the position and twisted relationship prescribed herein and that the mixing of conventional fibers such as "Dacron", aliphatic nylon, and the like, within and between the layers of aromatic polyamide fibers having the position and twisted relationship is likewise included within the scope of the invention. Additionally, the invention includes the use of fibers made from synthetic materials other than aromatic polyamide that have a tenacity of from 12 to about 25 grams per denier with an elongation at break of about 2% to about 8% and that the use of such fibers in the manner prescribed herein is within the scope of the invention.

What is claimed is:

1. An improved flexible reinforced hose adapted for use in the conveyance of fluids under pressure, said hose comprising a core tube having a laminated wall comprising an inner layer of extruded flexible nylon material and an outer layer of extruded flexible polyurethane material, a first layer of synthetic reinforcement fibers wound helically about the core tube with at least a portion thereof bonded to the core tube by embedment in the polyurethane material, a second layer of synthetic reinforcement fibers wound helically about the first layer, a third layer of synthetic reinforcement fibers wound helically about the second layer, a fourth layer of synthetic fibers wound helically about the third layer, a braided layer of reinforcement fibers disposed about the fourth layer, and a protective sheath disposed about the braided layer, said second layer wound in a direction opposite to the winding direction of the first layer and said fourth layer wound in a direction opposite to the winding direction of the third layer, said synthetic fibers of the helically wound layers having a tenacity of from about 12 to about 25 grams per denier and an elongation at break of from about 2% to about 8%, and said fibers of the braided layer comprising a nylon or poly(ethylene-terephthalate)ester material; wherein the improvement comprises: said hose having improved resistance to flexing and pressure pulsation fatigue provided by the synthetic fibers of the first and second layers comprising a plurality of the same or different deniers of said fibers, the deniers of the fibers having a twist of 1.5 turns per inch or less, corded together with a twist of more than 2 and less than 20 turns per inch in a direction opposite to the direction of twist in each of the deniers and the synthetic fibers of the third and fourth layers comprising a plurality of the same or different deniers of said fiber having a twist of about 1.5 turns per inch or less.

2. The hose of claim 1 wherein the corded synthetic fibers that have a twist of more than about 1.5 turns per inch have a twist of from about 4 to about 10 turns per inch.

3. The hose of claim 1 wherein the said synthetic fiber layers and the braided layer and sheath are bonded together by means of an extruded polymeric material.

4. The hose of claim 1 wherein the sheath is an extruded nylon or polyurethane material.

5. An improved flexible reinforced hose adapted for use in the conveyance of fluids under pressure, said hose comprising a core tube, a plurality of reinforcement layers disposed about the core tube comprising at least two layers of synthetic fibers having a tenacity of from about 12 to 25 grams per denier and elongation at break of from about 2% to about 8%, and a protective sheath disposed about the reinforcement layers; wherein the improvement comprises: said hose having improved resistance to flexing and pulsation fatigue provided by the said synthetic fiber layers disposed about the core tube as a first braided layer of the said fibers disposed in adjacent relationship about the outer surface of the core tube, a second braided layer of the said fibers disposed about the first layer, said fibers of the first layer comprising a plurality of the same or different deniers of said fibers, the deniers of the fibers having a twist of 1.5 turns per inch or less, corded together with a twist of more than two turns per inch and less than twenty turns per inch in a direction opposite to the direction of twist in each of the deniers, and said fibers of the second layer comprising a plurality of the same or different deniers of said fibers having a twist of about 1.5 turns per inch or less.

6. An improved flexible reinforced hose adapted for use in the conveyance of fluids under pressure, said hose comprising a core tube, a plurality of reinforcement layers disposed about the core tube comprising at least two layers of synthetic fibers having a tenacity of from about 12 to 25 grams per denier and an elongation at break of from about 2% to about 8%, and a protective sheath disposed about the reinforcement layers; wherein the improvement comprises: said hose having improved resistance to flexing and pulsation fatigue provided by the said synthetic fiber layers disposed about the core tube as a first braided layer of the said fibers disposed in adjacent relationship about the outer surface of the core tube, a second layer of the said fibers wound helically about the first layer, a third layer of said fibers wound helically about the second layer in a direction opposite to the winding direction of the second layer, said fibers of the first layer comprising a plurality of the same or different deniers of said fibers, the deniers of the fibers having a twist of 1.5 turns per inch or less, corded together with a twist of more than two turns per inch and less than twenty turns per inch in a direction opposite to the direction of twist in each of the deniers, and said fibers of the second and third layer comprising a plurality of the same or different deniers of said fibers having a twist of about 1.5 turns per inch or less.

7. An improved flexible reinforced hose adapted for use in the conveyance of fluids under pressure, said hose comprising a core tube, a plurality of reinforcement layers disposed about the core tube comprising at least two layers of synthetic fibers having a tenacity of from about 12 to 25 grams per denier and an elongation at break of from about 2% to about 8%, and a protective sheath disposed about the reinforcement layers; wherein the improvement comprises: said hose having improved resistance to flexing and pulsation fatigue provided by said synthetic fiber layers disposed about the core tube as a first layer of the said fibers wound helically in adjacent relationship about the outer surface of the core tube, a second layer of the said fibers wound helically about the first layer in a direction opposite to the winding direction of the first layer, a braided third layer of the said fibers disposed about the second layer, said fibers of the first and second layers comprising a plurality of the same or different deniers of said fibers, the deniers of the fibers having a twist of 1.5 turns per inch or less, corded together with a twist of more than two turns per inch and less than twenty turns per inch in a direction opposite to the direction of twist in each of the deniers, and said fibers of the third braided layer comprising a plurality of the same or different deniers of said fibers having a twist of about 1.5 turns per inch or less.

8. An improved flexible reinforced hose adapted for use in the conveyance of fluids under pressure, said hose comprising a core tube, a plurality of reinforcement layers disposed about the core tube comprising at least two layers of synthetic fibers having a tenacity of from about 12 to 25 grams per denier and an elongation at break of from about 2% to about 8%, and a protective sheath disposed about the reinforcement layers; wherein the improvement comprises: said hose having improved resistance to flexing and pulsation fatigue provided by the said synthetic fiber layers disposed about the core tube as a first layer of the said fibers wound helically in adjacent relationship about the outer surface of the core tube, a second layer of the said fibers wound helically about the first layer, a third layer of said fibers wound helically about the second layer, and a fourth layer of the said fibers wound helically about the third layer, said second layer wound in a direction opposite to the winding direction of the first layer and said fourth layer wound in a direction opposite to the winding direction of the third layer, said fibers of the first and second layers comprising a plurality of the same or different deniers of said fibers, the deniers of the fibers having a twist of 1.5 turns per inch or less, corded together with a twist of more than two turns per inch and less than twenty turns per inch in a direction opposite to the direction of twist in each of the deniers, and said fibers of the third and fourth layers comprising a plurality of the same or different deniers of said fibers having a twist of about 1.5 turns per inch or less.

9. The hose of claim 5, 6, 7 or 8 wherein the first layer of the said synthetic fibers is bonded to the core tube.

10. The hose of claim 5, 6, 7 or 8 wherein one or more of the layers of the said synthetic fiber layer combinations are bonded together.

11. The hose of claim 5, 6, 7 or 8 wherein the wall of the core tube has two layers comprising an inner layer of extruded flexible nylon material and an outer layer of extruded flexible polyurethane material and at least a portion of the first layer of the said synthetic fibers is embedded in the polyurethane layer as a result of solvation of the outer surface of the polyurethane material.

12. The hose of claim 5, 6, 7 or 8 having one or more additional layers of reinforcement material disposed between the sheath and the said synthetic fiber layer combinations.

13. The hose of claim 5, 6, 7 or 8 having only one additional reinforcement layer, said layer comprising braided nylon or poly(ethylene-terephthalate)ester fibers disposed about the said synthetic fiber layers combinations.

14. The hose of claim 5, 6, 7 or 8 wherein the sheath is an extruded flexible nylon or polyurethane material.

15. The hose of claim 10 wherein the layers are bonded together by means of an extruded polymeric material.

16. The hose of claim 5, 6, 7 or 8 wherein the sheath is bonded to the outermost layer of the said synthetic fiber layer combinations.

17. The hose of claim 13 wherein the sheath is bonded to the braided layer.

18. The hose of claims 15 wherein the sheath is bonded by means of an extruded polymeric material.

19. The hose of claim 16 wherein the sheath is bonded by means of an extruded polymeric material.

* * * * *